No. 625,597. Patented May 23, 1899.
S. L. PHILLIPS & G. G. TILDEN.
MEANS FOR ASCERTAINING THE POTENTIAL AT ANY POINT UPON SYSTEMS OF ELECTRICAL DISTRIBUTION.
(Application filed Mar. 6, 1899.)
(No Model.)
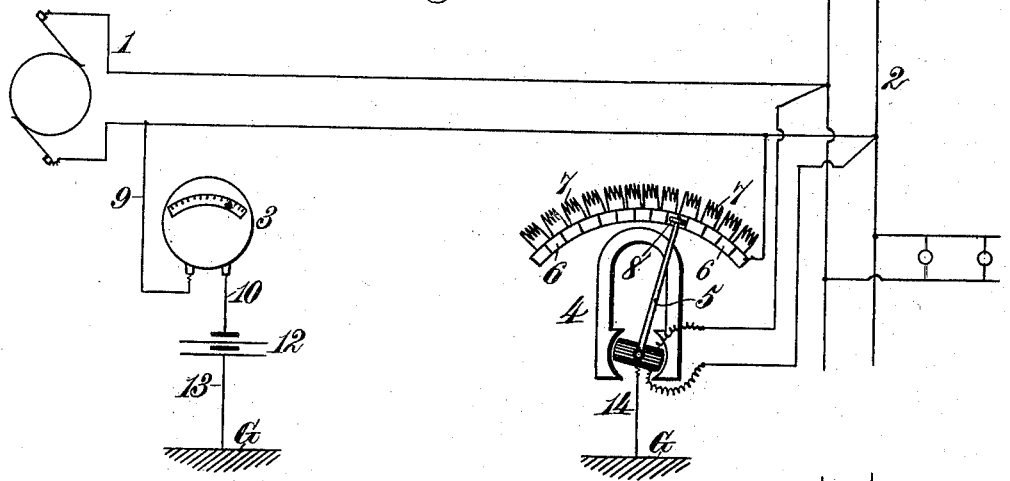
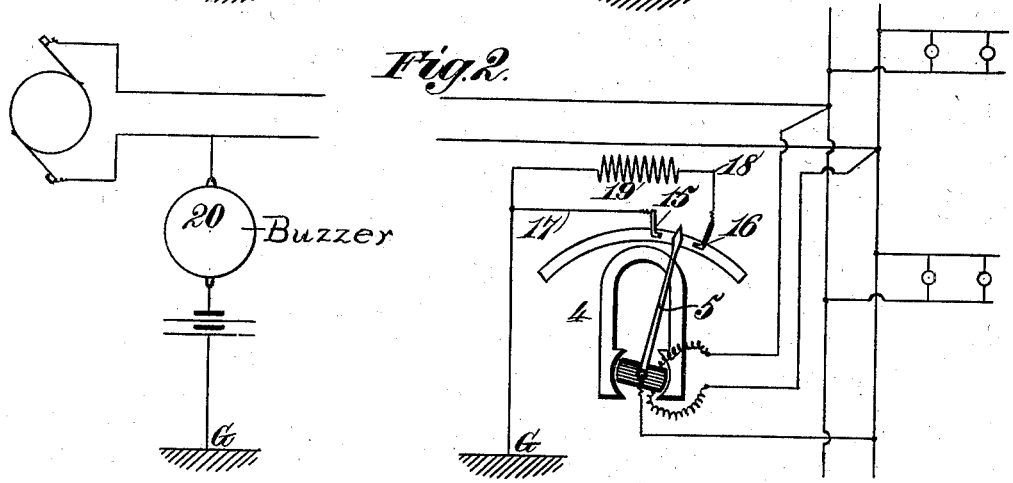
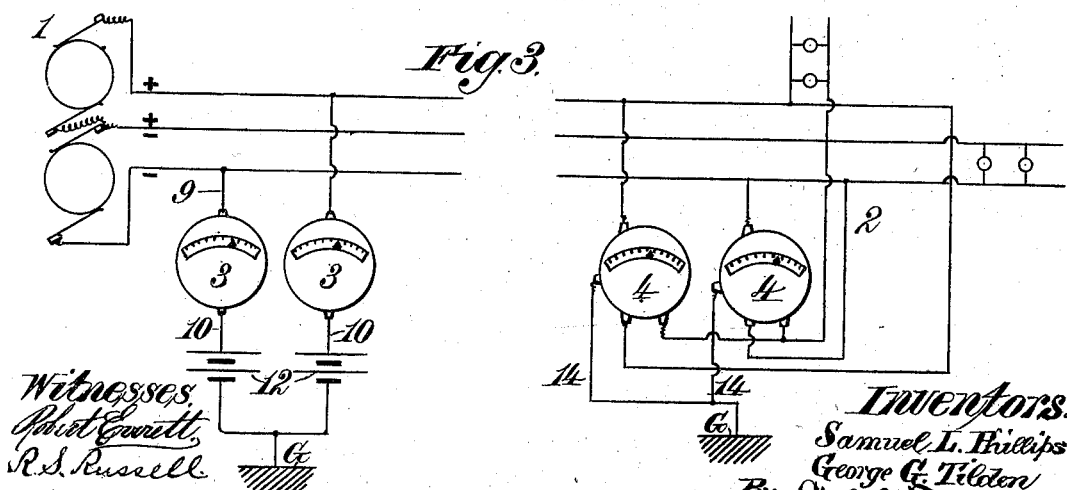

UNITED STATES PATENT OFFICE.

SAMUEL L. PHILLIPS AND GEORGE G. TILDEN, OF WASHINGTON, DISTRICT OF COLUMBIA.

MEANS FOR ASCERTAINING THE POTENTIAL AT ANY POINT UPON SYSTEMS OF ELECTRICAL DISTRIBUTION.

SPECIFICATION forming part of Letters Patent No. 625,597, dated May 23, 1899.

Application filed March 6, 1899. Serial No. 708,011. (No model.)

*To all whom it may concern:*

Be it known that we, SAMUEL L. PHILLIPS and GEORGE G. TILDEN, citizens of the United States, residing at Washington, in the District of Columbia, have invented certain new and useful Improvements in Means for Ascertaining the Potential at any Point upon Systems of Electrical Distribution, of which the following is a specification.

Under the present systems of electrical distribution it has been necessary to run pressure-wires from the generating-station to the center of distribution in order that the potential at the point last named may be indicated at the station. The cost of these wires, the conduits they occupy, and the expense of laying them and keeping them in proper condition is a large addition to the standing charges of a generating-station.

It is the purpose of the present invention to do away with the pressure-wires by substituting in their place simple and inexpensive means for accomplishing the same purposes without requiring any increase of the outfit of the station and without adding to the standing charges.

The invention consists to these ends in the novel features hereinafter fully described and then specifically pointed out and defined in the claims that follow this specification.

For the purposes of the following description reference will be had to the accompanying drawings, in which—

Figure 1 is a diagram illustrating the application of the invention to a two-wire system. Fig. 2 is a view showing a modification. Fig. 3 is a view showing the invention applied to a balanced or three-wire system.

The reference-numeral 1 indicates the central station or point of generation, and the numeral 2 denotes the center of distribution or other point where it is desired to know the voltage of the system. At the station is an indicating instrument, such as a voltmeter 3, which may be of any ordinary type, but is preferably so constructed as to have a considerable range of indication for a comparatively small variation in potential. At the center of electrical distribution is placed a second pressure-indicator 4, which is connected across the mains and varies in its indications with the variations of potential at that point. The index 5 of this instrument moves over a graduated arc composed of a series of conducting-segments 6, insulated from each other, but connected by a corresponding series of resistance-coils 7. Upon the end of said index is a traveling contact 8, preferably arranged to roll upon the surfaces of the insulated segments 6. The voltmeter 3 is connected by a wire 9 from one of its terminals to one of the mains. Its other terminal is connected by a wire 10 to one pole of a battery 12, such as a Daniell's cell. The other pole of the battery is grounded by a wire 13. The voltmeter 4 has its index 5 connected to the earth by a wire 14, leading from the pivotal support of said index to a ground-plate. The voltmeter 3 is calibrated in such manner that the variations of potential denoted by the instrument 4 will be correspondingly indicated by the index of said voltmeter 3. In other words, if the normal potential at the center of distribution is one hundred volts this will be shown on both the instruments 3 and 4; but as the potential of the instrument 3 is that of the battery-circuit in which it is included, and as variations are due to the rise and fall of the potential of that circuit produced by the variations from normal of the index 5 it is evident that the calibrations of the instrument 3 must be specially adapted to these conditions.

The operation of the parts thus far explained is as follows: As the index 5 in the indicating instrument 4 moves over the segments 6 in one direction it cuts out of the circuit of the battery 12 a number of the resistances 7 corresponding to the number of segments over which it moves, and by moving in the opposite direction it cuts into said circuit a resistance for each of the segments 6 over which it passes. By this means the battery-circuit is varied in potential in such degree that the index of the voltmeter 3 will move with the index 5 of the instrument 4 and will reproduce the readings of the latter, so that the rise and drop in potential at the center of distribution will be accurately known at the generating-station without the expense of running pressure-wires. The invention is applied to a balanced system in the same manner, the instruments being merely duplicated, and one connected to each of the mains.

A maximum and minimum indicator may be used, as shown in Fig. 2, in which the index 5 vibrates between two contacts 15 and 16, both connected to earth through wires 17 and 18, a resistance 19 being interposed in the latter wire. In this arrangement a suitable signal—such as a bell, buzzer, or other device 20—is used in place of the voltmeter 3. The loud or subdued sound of this signal indicates the engagement of the index 5 with the contacts 15 or 16, respectively.

What we claim, and desire to secure by Letters Patent, is—

1. In a system of electrical distribution, the combination with the mains at any point of distribution of an instrument to indicate the rise and drop of potential at that point, and an instrument at the generating-station responding to said indications, substantially as described.

2. In a system of electrical distribution, the combination with the mains at any point of distribution, of an instrument to indicate the rise and drop of potential at that point, a voltmeter at the generating-station, connected to one of the mains and to earth through a battery, and a series of resistances successively cut in and out of the battery-circuit by the movement of the index of the instrument at the said point of distribution, substantially as described.

3. The combination with a system of electrical distribution of a measuring instrument at any point of distribution connected to the mains at that point to indicate variations in potential, a responding instrument at the generating-station connected to one of the mains and to earth through a battery, and one or more resistances in the battery-circuit, cut in or out by the vibration in opposite directions of the index of the measuring instrument, substantially as described.

In testimony whereof we have hereunto set our hands in presence of two subscribing witnesses.

SAMUEL L. PHILLIPS.
GEO. G. TILDEN.

Witnesses:
ROBERT S. RUSSELL,
CHAS. B. TILDEN.